United States Patent Office 2,711,932
Patented June 28, 1955

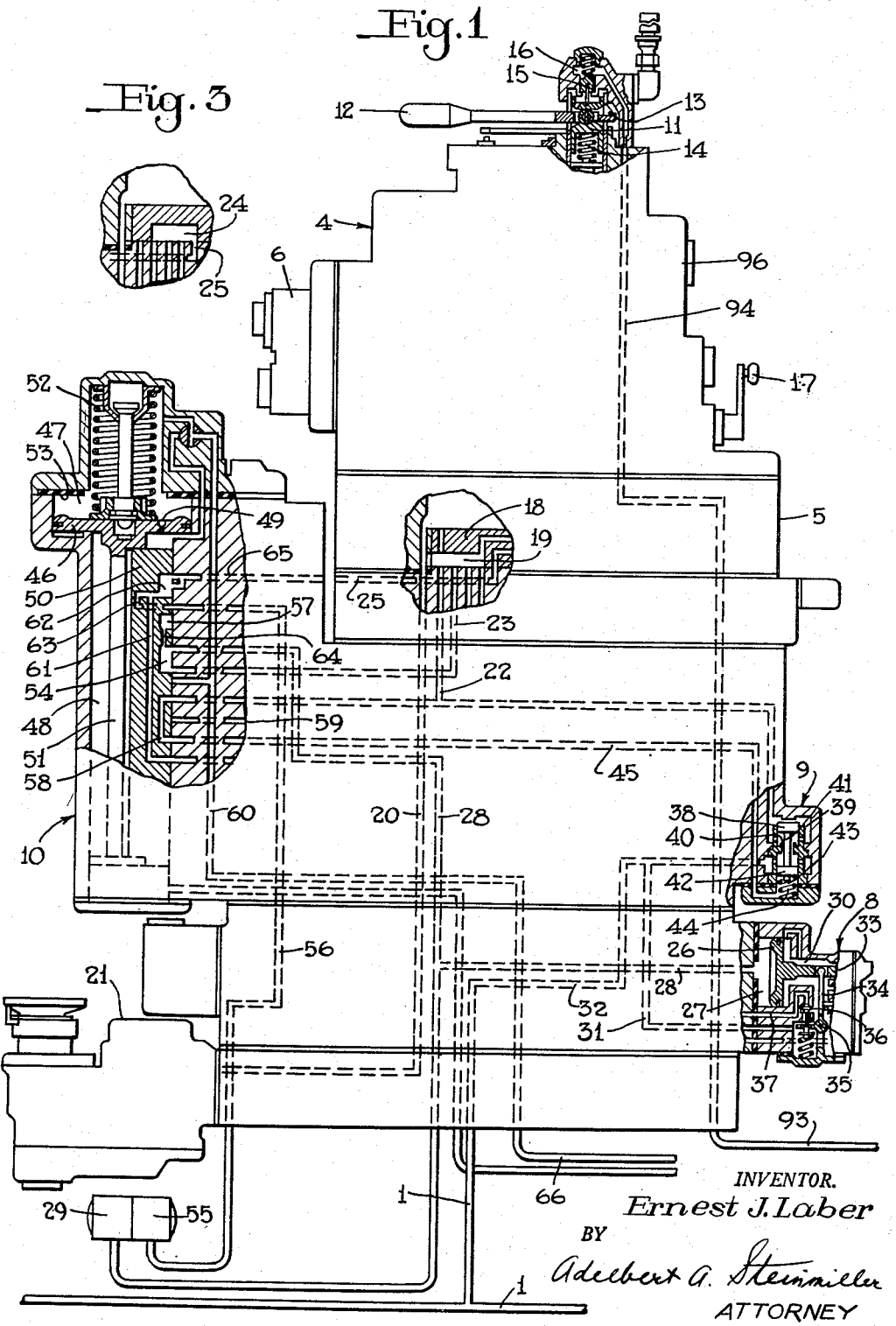

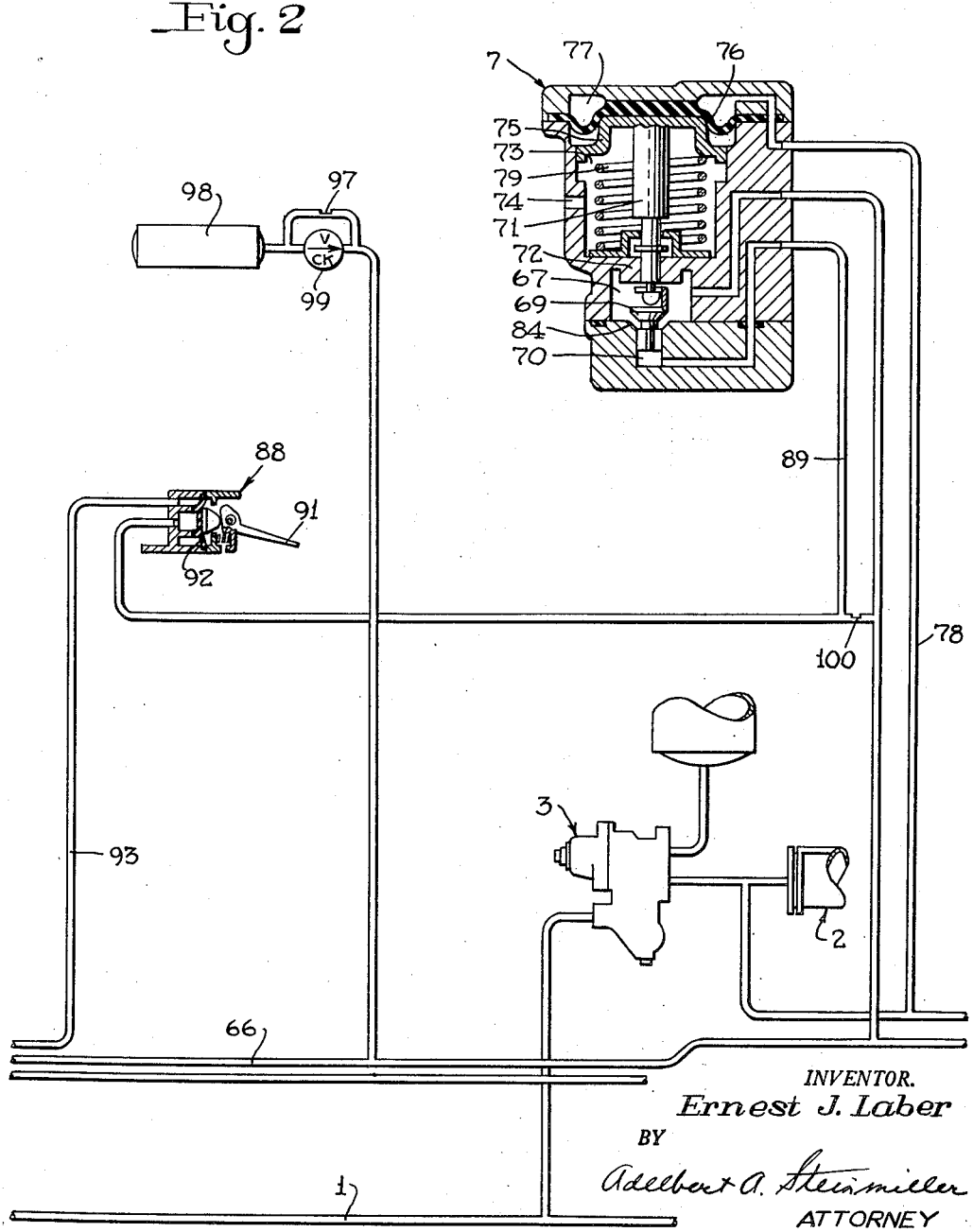

2,711,932

FLUID PRESSURE BRAKE APPARATUS

Ernest J. Laber, Adamsburg, Pa., assignor to Westinghouse Air Brake Company, Wilmerding, Pa., a corporation of Pennsylvania Application April 25, 1952, Serial No. 284,397

1 Claim. (Cl. 303—19)

This invention relates to fluid pressure brake equipment for railway vehicles and more particularly to fluid pressure brake equipment wherein a safety control or deadman application is automatically suppressed when the brakes are applied with a braking force in excess of a certain uniform degree.

Vehicles, such as railway cars or trains, are commonly provided with a fluid pressure brake equipment including a foot-operated valve device and a hand-operated valve device adapted when physical pressure on both is relieved, as upon incapacitation of the operator, to reduce the pressure in a so-called safety control pipe and thereby cause a so-called "deadman" service application of the brakes. In order to suppress such a deadman application of the brakes, a safety control suppression valve device is commonly provided to prevent reduction of the pressure in the safety control pipe when the brake cylinder pressure established during a normal application exceeds a certain pressure, thus enabling the operator to release the physically applied pressure on both the hand-operated and foot-operated valve device without causing a deadman service application of the brakes. However, when the brakes are released, the suppression valve device will operate to again connect the safety control pipe to the aforementioned safety control device through conduits, which are of such capacity at atmospheric pressure as to effect a reduction in the pressure of fluid in the safety control pipe of sufficient magnitude to cause the brake application valve to effect an undesirable reapplication of the brakes.

It is accordingly an object of my invention to provide novel means for obviating the above-mentioned undesirable reapplication of the brakes.

Other objects and advantages will become apparent from the following detailed description viewed in connection with the accompanying drawings, wherein Figs. 1 and 2, when the right-hand edge of Fig. 1 is matched with the left-hand edge of Fig. 2 is a diagrammatic view, partly in section and partly in outline, of that part of a locomotive brake equipment embodying the invention. Fig. 3 represents a diagrammatic sectional view of a portion of the engineer's valve of Fig. 1.

Description

The brake equipment shown in the drawings, except for a portion thereof constituting the invention, may be identical to that fully disclosed in Westinghouse Air Brake Company's instruction pamphlet No. 5066 dated March 1948 for the 24–RL locomotive brake equipment, which equipment is similar to that disclosed in Patent No. 2,256,283 issued on September 16, 1941 to E. E. Hewitt et al., in view of which only such parts of said equipment are shown in the drawings as are deemed necessary to a clear understanding of the invention.

In the drawings reference numeral 1 designates a brake pipe which is adapted to extend through the train and through the medium of which the brakes on the train are adapted to be controlled on the well-known pneumatic principle. Reference numeral 2 designates a brake cylinder device arranged to be operated by fluid under pressure supplied by a brake controlling valve device 3, in response to a reduction in pressure of fluid in brake pipe 1, to effect an application of brakes on a vehicle.

An engineer's brake valve device 4 is provided for controlling the brakes on a train and comprises an automatic brake control portion 5 for controlling pressure of fluid in brake pipe 1, a self-lapping straight-air control portion 6, which is not pertinent to the invention, a safety control suppression valve device 7, an equalizing discharge valve device 8, a brake pipe cut-off valve device 9, and a brake application valve device 10.

The brake valve device 4 further comprises a vertically disposed shaft 11 suitably journaled in the casing and, connected to said shaft for rotating same is a handle 12 movable in a horizontal plane to release, running, first service, lap and emergency positions, as described in the aforementioned pamphlet. The handle 12 is fulcrumed for vertical movement relative to shaft 11 on a pin 13 carried by said shaft. During running of a train with the brakes thereon released either the handle 12 or a device to be subsequently described, is adapted to be held in a depressed position. With handle 12 depressed, in which position it is shown in the drawing, a spring 14 carried by the shaft 11 is compressed. Upon release of manual pressure on handle 12 the spring 14 is adapted to turn said handle about the pin 13 for opening a valve 15 to establish a vent to atmosphere from a chamber 16 containing said valve. With handle 12 in its normal depressed position the valve 15 will be closed. Mounted on one side of the brake valve housing is a selector handle 17 for selectively connecting either the automatic brake control portion 5 or the self-lapping straight-air control valve device 6 to shaft 11 for control thereby. For the purpose of this description we will assume that handle 17 is in a position for rendering the automatic control portion 5 effective in controlling application of the brakes.

The automatic brake control portion 5 comprises a rotary valve 18 adapted when the selector handle 17 is in its automatic position to be turned by the handle 12 to positions corresponding to those of said handle. In running position of handle 12 and the rotary valve 18, a cavity 19 in said valve establishes communication between a passage 20, adapted to be constantly supplied with fluid under pressure from a feed valve device 21 in the usual manner, and passages 22 and 23 the passage 22 leading to the brake application valve device 10 and to the brake pipe cut-off valve device 9, while the passage 23 leads only to the brake application valve device 10. In service position of the rotary valve 18 the communication just described is adapted to be closed, passage 22 is adapted to be lapped by the rotary valve 18, while passage 23 is adapted to be connected via cavity 24 (Fig. 3) in said rotary valve to an atmospheric vent port 25. In lap position of the handle 12 and rotary valve 18 the passage 25 is also adapted to be lapped by said rotary valve.

The equalizing discharge valve device 8 comprises a piston 26, at one side of which is a chamber 27 open by way of a passage 28 to the brake application valve device 10 and to an equalizing reservoir 29. At the opposite side of piston 26 is a chamber 30 open by way of passages 31 and 32 to brake pipe 1 and into which projects a stem 33 from said piston. Connected to the stem 33 is the end of one arm of a bell crank 34 fulcrumed on a pin 35 secured in the casing. Connected to the other arm of the bell crank 34 is a brake pipe discharge valve 36 for controlling communication between the brake pipe chamber 30, and thereby the brake pipe 1 and an atmospheric vent passage 37.

The brake pipe cut-off valve device 9 comprises a valve 38 disposed in a chamber 39 and arranged to cooperate with a seat 40 for controlling communication between passage 22 and the brake pipe passage 32. The cut-off valve 38 is secured to one end of a stem 41 connecting said valve to a piston 42 subject on one side to brake pipe pressure from passage 32 and on the opposite side to pressure of fluid in a chamber 43 and that of a spring 44 contained in said chamber. Chamber 43 is connected to a passage 45 leading to the brake application valve device 10.

The brake application valve device 10 comprises a piston 46 at one side of which is a chamber 47, while at the opposite side is a valve chamber 48 adapted to be constantly supplied with fluid under pressure. A restricted port 49 through piston 46 provides for charging of chamber 47 with fluid under pressure from the valve chamber 48. Contained in valve chamber 48 is a slide valve 50 connected for movement by and with the piston 46 through the medium of a stem 51. When chamber 47 is supplied with fluid at sufficient pressure via port 49, a spring 52 contained in said chamber is adapted to move the piston 46 and slide valve 50 to a normal position, in which they are shown in the drawing. Upon venting of fluid under pressure from chamber 47 at a rate exceeding the supply through the restricted port 49 the pressure of fluid in chamber 48 is adapted to move said piston and thereby the slide valve 50 against spring 52 to a brake application position defined by contact between said piston and a gasket 53.

The brake application slide valve 50 has a cavity 54 for, in the normal position of said valve, establishing communication between passage 23, from the rotary valve 18, and passage 28 leading to the equalizing reservoir 29 and the piston chamber 27 in the equalizing discharge valve mechanism 8, while in the brake application position of said valve this communication is adapted to be closed and the passage 28 connected to a reduction limiting reservoir 55 by way of a passage 56 and a cavity 57 in said slide valve and a restricted port 64 connecting said cavity to the cavity 54. The slide valve 50 also has a passage 58 for, in the normal position of said valve, opening passage 22 from the rotary valve to passage 45, and in the brake application position of said valve this communication is closed and passage 58 opens a passage 59 to a passage 60, which is connected to piston chamber 47.

In the brake application position of slide valve 50 a passage 61 and cavity 62 in said valve are arranged to connect passage 45 from the brake pipe cut-off valve device 9 to the atmospheric vent port 65, while in the normal position of said slide valve a port 63, open to cavity 62, is arranged to open a passage 56 to the atmospheric vent port 65, the passage 56 being connected to the reduction limiting reservoir. Chamber 47 in the brake application valve device 10 is in constant communication through a passage 60 and a pipe 66 with a chamber 67 in the suppression valve device 7.

The suppression valve device 7 comprises a valve 69 contained in chamber 67 and arranged to control communication between said chamber and a chamber 70. The valve 69 is connected for movement to one end of a stem 71 extending through a suitable bore in a partition wall 72 separating said chamber from a chamber 73 which is open to atmosphere through a port 74. Formed on the opposite end of the stem 71 within chamber 73 is a follower head 75 engaging one side of a flexible diaphragm 76. At the opposite side of diaphragm 76 is a pressure chamber 77 which is connected by a pipe 78 to the brake cylinder device 2 whereby, when an application of brakes is in effect on the locomotive, the diaphragm 76 will be subject in chamber 77 to fluid at brake applying pressure. A spring 79 contained in chamber 73 acts on the follower head 75 and thereby the diaphragm 76 with a chosen degree of pressure such as to hold diaphragm 76 in the position in which it is shown in the drawing to hold the valve 69 open until sufficient pressure is obtained in the brake cylinder device 2 to insure the safety of the locomotive. Any further increase in pressure in chamber 77 will then deflect the diaphragm 76 against spring 79 to close valve 69 and thereby communication between chambers 67 and 70. At a lower pressure the spring 79 will actuate the diaphragm 76 to open valve 69. In practice, the diaphragm 76 may be thus actuated by pressure of fluid in chamber 73 to close the valve 69 when such pressure is, for example, around 30 pounds and to permit opening of said valve by spring 79 when such pressure is around 20 pounds.

Chamber 70 in the suppression valve device 7 is connected to a treadle valve device 88 by a pipe 89. The treadle valve device 88 comprises a treadle 91 adapted to be depressed by the engineer to actuate a diaphragm valve 92 for closing communication between pipe 89 and a pipe 93, and thus prevent a safety control application of the brakes, when the brakes on the locomotive and cars of a train are released or applied to a degree less than that required to close valve 69 in the suppression valve device 7. Upon release of pressure on treadle 91 the diaphragm 92 is adapted to deflect out of the position in which it is shown on the drawing for opening communication between pipes 89 and 93. The pipe 93 is connected to chamber 16 provided in the brake valve device 4 above the handle 12 by way of a passage 94 extending through the brake valve device, whereby depression of the handle 12 to permit closing of valve 15 will serve the same purpose as depression of the treadle 91 by closing connection of application chamber 47 to atmosphere. The depression of either the treadle 91 or the brake valve handle 12 will therefore accomplish the same result whereby either one or the other may be depressed, as required to relieve the engineman, but both need not be held depressed at the same time.

*Operation*

In operation, let it be assumed that the valve chamber 48 of the brake application valve device 10 is charged with fluid under pressure and that either the treadle 91 or the brake valve handle 12 is depressed. Under this condition fluid under pressure from valve chamber 48 will equalize through port 49 into piston chamber 47 of the brake application valve device and then through the passage 60, pipe 66 to chamber 67 and past the open valve 69 in the suppression valve device 7 (assuming that the brakes on the locomotive are not applied) into chamber 70 and pipe 89, or from pipe 89 into pipe 93, depending upon whether the treadle 91 or brake valve handle 12 is depressed. When the pressure of fluid in piston chamber 47 is thus sufficiently increased, spring 52 will move the piston 46 and slide valve 50 to their normal position in which they are shown in the drawing and in which cavity 54 will open passage 23 to passage 28, cavity 58 will open passage 22 to passage 45 and cavity 62 and port 63 will open the reduction limiting reservoir 55 to atmosphere by way of the atmospheric port 65.

Fluid under pressure thus supplied to pipe 66 will also flow through a communication containing a choke 97 to a stabilizing reservoir 98. A check valve 99 controlling a communication of greater flow capacity than choke 97 is arranged in by-passing relation to said choke to permit flow of fluid under pressure from reservoir 98 to pipe 66 but to prevent reverse flow, the choke 97 being provided to control such reverse flow.

Let it further be assumed that the brake valve handle 12 is in running position whereby the rotary valve 18 will be likewise positioned regardless of the position of the selector handle 17. With the rotary valve 18 in running position, fluid under pressure supplied by the feed valve device 21 to passage 20 will flow therefrom through cavity 19 in said rotary valve to passage 23 and then through cavity 54 in the brake application slide valve 50 to passage 28 leading to the equalizing reservoir 29 and the equalizing piston chamber 27 whereby said reservoir and chamber will become charged with fluid at the pressure supplied by said feed valve device. At the same time, fluid supplied by the feed valve device to cavity 19 in the rotary valve 18 will flow to passage 22 and thence to the cut-off valve chamber 39 as well as through cavity 58 in the brake application slide valve 50 to passage 45 leading to piston chamber 43 of the cut-off valve device 9. With piston chamber 43 thus charged with fluid at the pressure supplied by the feed valve device, spring 44 will actuate piston 42 to open valve 38 whereby fluid at feed valve pressure present in passage 22 will flow past said valve to passage 32 and thence to chamber 30 in the equalizing discharge valve mechanism 8 and to the brake pipe 1 for charging chamber 30 and said brake pipe. The brake controlling valve device 3 will operate to its release position in response to this charging of brake pipe 1 to open to atmosphere its pipe connection with pipe 78 and thereby the brake cylinder device 2.

Now let it be assumed that the selector handle 17 is in its automatic position and that the brake valve handle 12 is moved from running position to service position. The rotary valve 18 will thereby be moved to the position in which it is shown in Fig. 3 for cutting off supply of fluid under pressure from the feed valve passage 20 to passage 22 and thence to the brake pipe 1 and for at the same time releasing fluid under pressure from the equalizing reservoir 29 and equalizing piston chamber 27 to atmosphere via cavity 19 in said rotary valve and passage 25. In response to such reduction in pressure at one side of the equalizing discharge valve piston 26, brake pipe pressure acting on the opposite side in chamber 30 will move said piston in the direction of chamber 27 for thereby actuating bell crank 34 to open the brake pipe discharge valve 36 for releasing fluid under pressure from the brake pipe 1, in response to which the brake controlling valve device 3 will operate to supply fluid to the brake cylinder device 2 to apply the brakes on the locomotive to a degree proportional to the reduction in pressure in the equalizing reservoir 29. If less than a full service application of brakes is desired, then when the desired reduction in pressure in the equalizing reservoir 29 and piston chamber 28 is obtained, the handle 12 will be moved from service position back to lap position for closing off discharge of fluid from said reservoir and chamber whereby when the pressure of fluid in brake pipe 1 acting in chamber 30 at the opposite side of equalizing piston 26 becomes reduced to slightly below that in chamber 27, said piston will operate the bell crank 34 to close the discharge valve 36 for thereby limiting the reduction in pressure in brake pipe 1 to a corresponding degree, and the pressure of fluid obtained in the brake cylinder 2 to a proportional degree, in the well-known manner.

When the pressure of fluid obtained in the brake cylinder device 2 by operation of rotary valve 18 is sufficient to insure stopping of the train, such pressure acting in chamber 77 of the safety control suppression valve device 7 will deflect diaphragm 76 to close valve 69 for thereby closing communication between chamber 47 in the brake application valve device 10 and the treadle valve device 88, whereupon pressure by the engineer can be relieved on treadle 91 or brake valve handle 20, whichever has been held depressed, without venting fluid under pressure from piston chamber 47. However, if the degree of brake application is insufficient to close valve 69 in the suppression valve device 7 and physical pressure of the engineer is relieved on both the treadle 91 and brake valve handle 12, the pipe 89 and thereby pipe 93 connected to the brake valve device will both be vented through the suppression valve device 7, the foot valve device 88, and past the open valve 15 controlled by the brake valve handle 12. As a result, fluid under pressure will be vented from piston chamber 47 in the brake application valve device 10 and the piston 46 will operate to move the slide valve 50 to its brake application position.

When the slide valve 50 is thus moved to its brake application position, piston chamber 43 in the cut-off valve device 9 will be vented through passage 61 in the application slide valve 50 and the atmospheric passage 65 as a result of which brake pipe pressure acting on the opposite side of piston 42 will actuate said piston to close valve 38 and thereby the communication through which fluid under pressure is normally supplied to the brake pipe. At the same time the equalizing piston chamber 27 will be disconnected from passage 23 leading to the rotary valve 18 and opened through cavities 54, 57 and restricted port 64 in said valve to passage 56 leading to the reduction limiting reservoir 55 whereby the pressure of fluid in the equalizing reservoir 29 and equalizing discharge valve piston chamber 27 will reduce to equilization into said reduction limiting reservoir and the discharge valve mechanism 8 will operate to effect a service reduction in pressure in brake pipe 1 for causing operation of the brake controlling valve device 3 to suplpy fluid to the brake cylinder device 2 to effect a service application of brakes on the locomotive. The volume of the reduction limiting reservoir 55 may be such that the reduction in pressure in the equalizing reservoir 29 due to equalizing into said limiting reservoir will be sufficient to insure a full service application of the brakes on the locomotive.

In the brake application position of the brake application valve device 10, piston chamber 47 is vented by way of passage 60, cavity 58 in the slide valve 50 and passage 59 leading to a chamber (not shown) in the brake valve device 4, which latter chamber is open to atmosphere in the release, running and first service positions of the brake valve handle 12. The application piston chamber 47 will thus remain vented even upon subsequent depression of the treadle 91 or depressing of handle 12, to insure a full service application of brakes on the locomotive and thereby stopping of the locomotive and connected train in case of incapacitation of the engineer or failure to maintain the treadle 91 or handle 12 depressed as intended to safeguard the locomotive and train. If, however, the handle 12 is moved past the first service position at the time the treadle 91 and/or handle 12 are relieved of pressure, the atmospheric connection to the above mentioned chamber in the brake valve device will be closed so that even though the brake application piston 46 and slide valve 50 move to their application position, the pressure of fluid obtained in the brake cylinder device 2 and thereby in chamber 77 of the suppression valve device 7 will eventually become sufficient to operate said suppression valve device to close valve 69 so that piston chamber 47 of the brake application valve device will be recharged with fluid under pressure to permit spring 52 to return piston 46 and slide valve 50 to their normal position.

In order to effect a release of the brakes the brake valve handle 12 must be moved to running position, in which it is shown in Fig. 1, and either said handle or the treadle 91 must be depressed. Fluid under pressure supplied by the feed valve device 21 will then flow through the same passages and in the same manner as described in connection with the charging of the equipment. Also fluid under pressure supplied to chamber 48 in the application valve device 10 will flow through port 49 in piston 46 and thence through passage 60 and pipe 66 to chamber 67 in suppression valve device 7. When fluid pressure in chambers 46 and 48 approaches equalization, spring 52 will be permitted to actuate piston 46 and connected slide valve to their normal positions shown in Fig. 1.

Fluid under pressure supplied to chamber 67 however will not be permitted to flow to pipe 89 by reason of valve 69 being held closed by pressure of fluid in chamber 77, which condition will continue until the brake controlling valve device 3 operates in response to the increase in brake pipe pressure to release fluid under pressure from brake cylinder device 2 and likewise chamber 77. Upon sufficient reduction in pressure in chamber 77 through valve device 3 spring 79 will actuate follower head 75 to open valve 69. As previously noted, if pipes 89, 93 and passage 94 are relatively long, the aggregate volume thereof at atmospheric pressure when valve 69 opens, would reduce the fluid pressure in chamber 47 of the application valve device 10 at such a rapid rate and to such a degree as to move piston 46 and connected slide valve 50 to application position, thereby effecting an undesiderable reapplication of the brakes.

In this embodiment of the invention, however, a choke 100 has been provided in a communication between pipes 66 and 89 so that in the interim between the movement of application valve device 10 to its normal position and the opening of valve 69 in suppression valve device 7, fluid under pressure supplied to pipe 66 will flow at a restricted rate through choke 100 to pipe 89 the exhaust of which may be bottled up either at treadle valve device 88 or at brake valve handle 12. A fluid pressure will thus be developed in pipe 89 so that it will be partially charged when valve 69 opens and consequently the drop in fluid pressure in pipe 66 will be lessened to such a degree that the application piston 46 will not be moved to application position. The additional volume of reservoir 98 connected through check valve 99 to pipe 66 will also lessen the effect of this reduction upon the application piston.

If the application piston 46 is already in its normal position as when a normal release of the brakes is effected after a normal brake application, pipe 89 will be charged by way of choke 100 during the interim between the closing of the safety control exhaust of pipe 89 and the reduction of pressure in chamber 77 to less than 30 pounds. This likewise will be sufficient time to partially recharge pipe 89 before unseating of valve 69.

*Summary*

From the foregoing it will now be seen that I have provided means adapted to be associated with the 24–RL locomotive brake equipment for preventing an undesirable reapplication of brakes on the locomotive during a release of the brakes after the safety control pipe has been vented to atmosphere and reclosed.

Having now described the invention, what I claim as new and desire to secure by Letters Patent, is:

In a locomotive brake equipment, in combination, means including an operator's brake valve device operative to effect an application of the locomotive brakes, a safety control pipe, brake application means operative in response to a reduction in pressure of fluid in said safety control pipe to an application position to also effect an application of the brakes, a safety control device normally holding fluid under pressure in said safety control pipe and operative in response to release of physical pressure on said control device to effect a reduction in the pressure of fluid in said safety control pipe, suppression means interposed in said safety control pipe between said brake application means and said safety control device and arranged to respond to a chosen degree of brake application effected by either said brake valve device or said brake application means to close communication through said safety control pipe between said brake application means and said safety control device, means providing a constant controlled rate of supply of fluid under pressure to said safety control pipe at the brake application means side of said suppression means, and flow restricting means connected to said safety control pipe in by-passing relation to said suppression means providing for flow of fluid under pressure through said safety control pipe to said safety control device with said communication closed.

References Cited in the file of this patent

UNITED STATES PATENTS

| | | |
|---|---|---|
| 2,068,376 | Craig | Jan. 19, 1937 |
| 2,137,017 | Good | Nov. 15, 1938 |
| 2,256,283 | Hewitt et al. | Sept. 16, 1941 |
| 2,486,271 | Folker | Oct. 25, 1949 |